United States Patent [19]
MacLeod et al.

[11] Patent Number: 6,061,894
[45] Date of Patent: May 16, 2000

[54] METHOD AND APPARATUS FOR ASSEMBLING DISC DRIVE MOTORS UTILIZING MULTIPOSITION PRELOAD/CURE FIXTURES

[75] Inventors: Donald J. MacLeod, Santa Cruz; Alex Gredinberg, San Jose; Gregg P. Stevens, Boulder Creek, all of Calif.

[73] Assignee: Seagate Technologies, Inc., Scotts Valley, Calif.

[21] Appl. No.: 09/088,653

[22] Filed: Jun. 1, 1998

Related U.S. Application Data

[60] Provisional application No. 60/053,433, Jul. 22, 1997.

[51] Int. Cl.[7] .................................................. H02K 15/00
[52] U.S. Cl. .......................... 29/596; 29/598; 29/281.3; 29/281.5; 29/732; 29/760
[58] Field of Search .................... 29/596, 598, 281.3, 29/281.5, 732, 760, 281.1; 156/60, 182, 358; 310/42, 43, 45

[56] References Cited

U.S. PATENT DOCUMENTS

| | | | |
|---|---|---|---|
| 4,048,717 | 9/1977 | Piette | 29/732 |
| 4,704,319 | 11/1987 | Belanger et al. | 428/209 |
| 5,325,575 | 7/1994 | Ichikawa | 209/281.3 |

*Primary Examiner*—P. W. Echols
*Assistant Examiner*—John C. Hong
*Attorney, Agent, or Firm*—Lariviere Grubman & Payne, LLP

[57] ABSTRACT

An method and apparatus for the assembly of motors utilizing curable adhesives. The method includes stations for: treating motor components with adhesive, assembling the motor components piece by piece, holding assembled motor components under compressive tension, overgramming components as needed, and an operational and life testing station. Integral to using the method are multiposition preload/cure fixtures. These fixtures include frame and base pieces. The frame holds assembled and adhesive treated motor components under compressive tension with spring loaded guide shafts during the curing process. The frame rests on the base. The base features nests which align the motor components for engagement with the guide shafts. The base also features a retractor bar to facilitate the insertion and removal of motor components. The base also features an overgramming means which supplies a brief overgramming pressure on the motor components to fully seat motor components. The present invention enables the rapid assembly and curing of motor components allowing efficient mass production of motors.

7 Claims, 9 Drawing Sheets

METHOD AND APPARATUS FOR ASSEMBLING DISC DRIVE MOTORS UTILIZING MULTIPOSITION PRELOAD/CURE FIXTURES

This application claims benefit of Provisional Appl. No. 60/053,433 filed Jul. 22, 1997.

TECHNICAL FIELD

The present invention relates to a method and apparatus for mass production of electric disc drive motors assembled with curable adhesives. In particular, the invention relates to an apparatus having a plurality of nests for aligning a plurality of motor components during assembly, and a removable frame for holding and tensioning the motor components during an adhesive curing process.

BACKGROUND OF THE INVENTION

A new system for mass producing disc drive motors is needed. The previous art utilized quick drying adhesives allowing motors to be assembled quickly and efficiently by hand. However, the advent of high performance disc drives, requiring sub micron distances between the head and the disc face, created new challenges. The previously used quick drying adhesives had a tendency to outgas small quantities of organic constituents. These minute quantities of outgassed volitiles adhered to the surfaces of the disc drives, forming a sub micron film which degraded performance and reliability, and also damaged the delicate sub micron components of the disc drives.

These complications made the use of quick drying adhesives impractical. The inventors remedied this problem by switching to an adhesive which did not emit significant amounts of organic volitiles (hereinafter referred to as "non-outgassing adhesives"). However, non-outgassing adhesives created their own problems. The non-outgassing adhesives cure much more slowly than the prior quick dry adhesives. The prior adhesives cured almost immediately, allowing quick easy hand assembly of motor components. A longer cure time wastes many man-hours while the assemblers hold motors under the required tension during the adhesive cure process. In the face of this difficulty, hand assembly is impractical. However, the need for mass production of motor components and motors remains.

An object of the present invention is to provide a method for quick and efficient mass production of electric disc drive motors using non-outgassing epoxy adhesives. A further object of the invention encompasses the multi-position preload/cure fixtures used to accomplish the method of motor construction. There is no known prior art.

DISCLOSURE OF THE INVENTION

The present invention accomplishes the above objectives cheaply and efficiently. The invention embodies a method for the step-wise construction of disc drive motors using non-outgassing epoxies instead of the previously used quick drying adhesives. The method involves the progressive assembly of the motors from their component parts. The method begins by treating the separate unassembled components with non-outgassing adhesives. These components are then assembled before the adhesive cures. The components are then allowed to cure. After curing, the assembled components are treated with adhesive again and assembled with additional motor components and allowed to cure. This process is repeated, each step adding further components. As the motors near completion the components must be kept under tension during the curing process. The apparatus' of the present invention accomplish this by holding the assembled motor components together with spring tensioned guide shafts (these apparatus' are also known as multiposition preload/curing fixtures). This is accomplished by placing a plurality of assembled and adhesive treated motor components on motor nests located on the apparatus. Each apparatus features motor nests shaped to accommodate the specific motor components involved. Once the components are placed in the motor nests the spring loaded guide shafts are inserted into the motor components to hold them firmly in place to maintain the components under compressive tension. On occasion the components do not fit together properly. To overcome this difficulty the apparatus is designed to push the components together with overgramming (Note: "overgramming" is a brief excess compressive pressure applied to the motor components to overcome any intercomponent binding, properly seating the assembled components). Once the components are assembled and firmly secured within the apparatus, the adhesive is cured. Once the assembly of the motor is complete, the finished motors are tested for correct operation and life expectancy.

As stated above, the method also encompasses the apparatus' used to construct the motors. The apparatus' hold motor components under tension during the adhesive curing process and seats the components by overgramming when necessary. Additionally, the apparatus' are easily loaded and unloaded to facilitate rapid motor assembly. It is a further feature of the apparatus' that they are compact, allowing many fixtures to be stacked in an oven should the adhesive curing phase involve heat curing.

Each apparatus has two (2) subparts; the first subpart is a base piece featuring a plurality of component nests for cradling the motor components. The second subpart is a removable frame piece for securing and compressing motor components. The frame is mounted removably on the base piece. Once positioned, the frame is secured to the base piece by a clamping means. The frame features a plurality of guide shafts with coaxially mounted tensioning springs for compressing and securing the adhesive treated and assembled motor components. The frame is mounted on the base such that the guide shafts can function with the nests of the base to firmly secure and compress the assembled motor components. In operation, the frame guide shafts are retracted by a retracting means mounted on the base. The preferred embodiment utilizes a pneumatic piston, as is known in the art, to operate the retracting means. When the frame is in this "open" configuration, the adhesive treated and assembled motor components are inserted into the nests mounted on the base piece. The nests are designed to cradle the specific motor components involved, maintaining them in the correct orientation until the frame can be "closed". Once a plurality of assembled motor components are loaded into the nests, the retracting means pushes the guide shafts back into place. If needed, a brief "overgramming" pressure is also applied to seat the adhesive treated components in their proper conformation. This is the "closed" position. The loaded frame is then released from the base piece and set aside allowing the adhesive to cure.

Motor assembly is completed in a step by step process with each component being treated with adhesive, fitted together with the appropriate adjoining component, then cured, and then progressively treated with adhesive and assembled with the next component. As the motor construction process nears completion, some motor component assemblies require compressive tension during curing. This is accomplished by loading assembled components into the previously mentioned fixtures, compressively tensioning, overgramming as necessary, then curing. Once the components are assembled into completed motors, operational and life testing are performed. The motor assembly is then complete.

The invention is more fully described and particularly pointed out in the accompanying drawings, the disclosure, and claims below. It shall be noted that the following drawings and disclosure illustrate but one embodiment of the various ways the invention may be practiced.

DETAILED DESCRIPTION OF THE INVENTION

Figure 1:
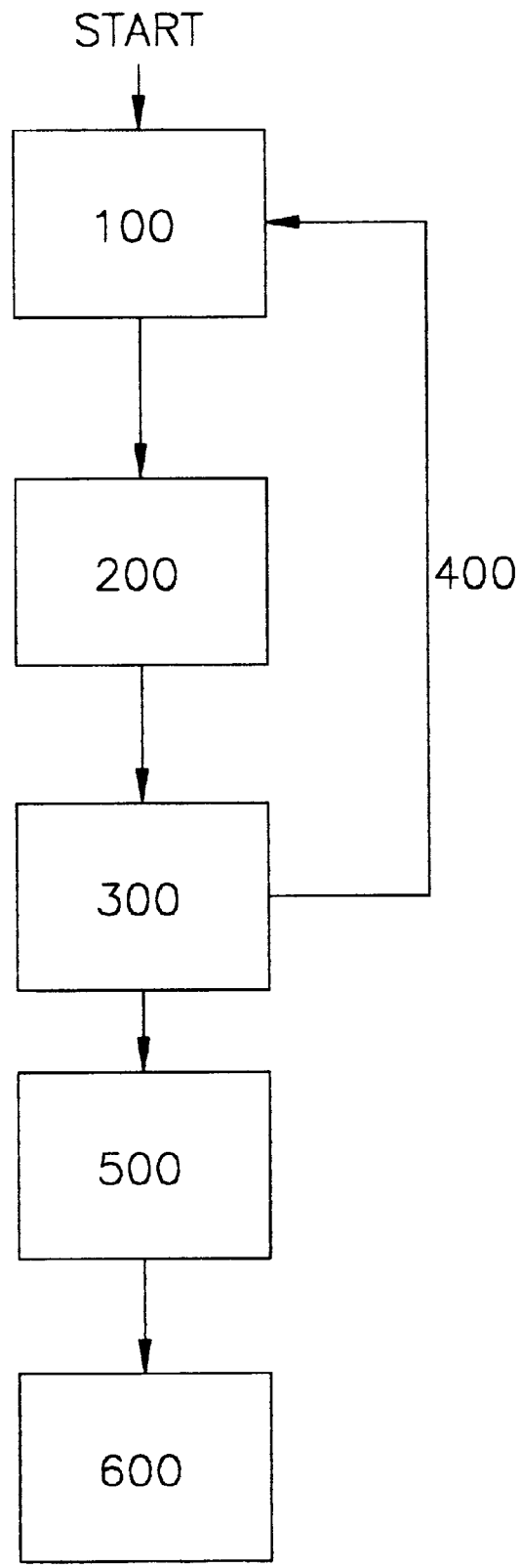
FIG. 1 is a flow diagram illustrating the motor assembly system as it passes through the various assembly stations in accordance with the present invention.

FIG. 1 depicts a flow diagram for the method of motor construction. The various stations are outlined beginning with the adhesive treatment station (100). At this initial station the unassembled motor components are treated with uncured adhesive. The preferred embodiment uses an adhesive dispensing system as described in patent application Ser. No. 08/820,714 (filed Mar. 18, 1997, entitled "Precision 2-Part Epoxy Dispensing Apparatus and Method") to dispense uncured adhesive onto the unassembled motor components. It should be noted that any adhesive dispensing method may be used to treat the components with adhesives. Typically, the adhesive is a two-part epoxy resin (for example 3M DP460, an epoxy resin manufactured by Adhesive Systems, 3M Industrial Tape and Specialties Division, St. Paul Minn. 55144-1000). This is followed by motor component assembly station (200) where said epoxy treated components are fitted together before the adhesive cures. The components are then cured at the curing station (300). The preferred embodiment uses curing ovens heated to about 60° C. and 70° C. to accelerate curing the adhesive. It should be noted that heat curing is not necessary to practice the invention. The adhesive may be cured at room temperature, but the cure time is extended. The motors are progressively assembled by repeatedly adding components (400). At various points during assembly, some of the adhesive treated and assembled components require compressive tension during curing. This is accomplished by using the multi-position preload/curing fixtures (500). Station 500 involves placing assembled and adhesive treated components into a multi-position preload/curing fixture, compressively tensioning them, then removing the frame of the fixture from the base then setting it aside allowing the adhesive to cure. Specifically, a first multi-position preload/curing, fixture is used to assemble the rear bearing (202) to the bearing holder (201) to form subassembly (203) (as shown in step 701a of FIG. 2A). A second fixture is used to assemble the hub (211), upper bearing (212), and magnet (213) into subassembly (211a) (as depicted in step 701b of FIG. 3). The same second multi-position preload/curing fixture is used to overgram and compressively tension the Stator assembly (211b) to the Rotor assembly (210c) as shown by steps "O" and 701c of FIG. 4. Once the motors are completely assembled, they are cured and then undergo operational and life testing (600).

Figure 2A:
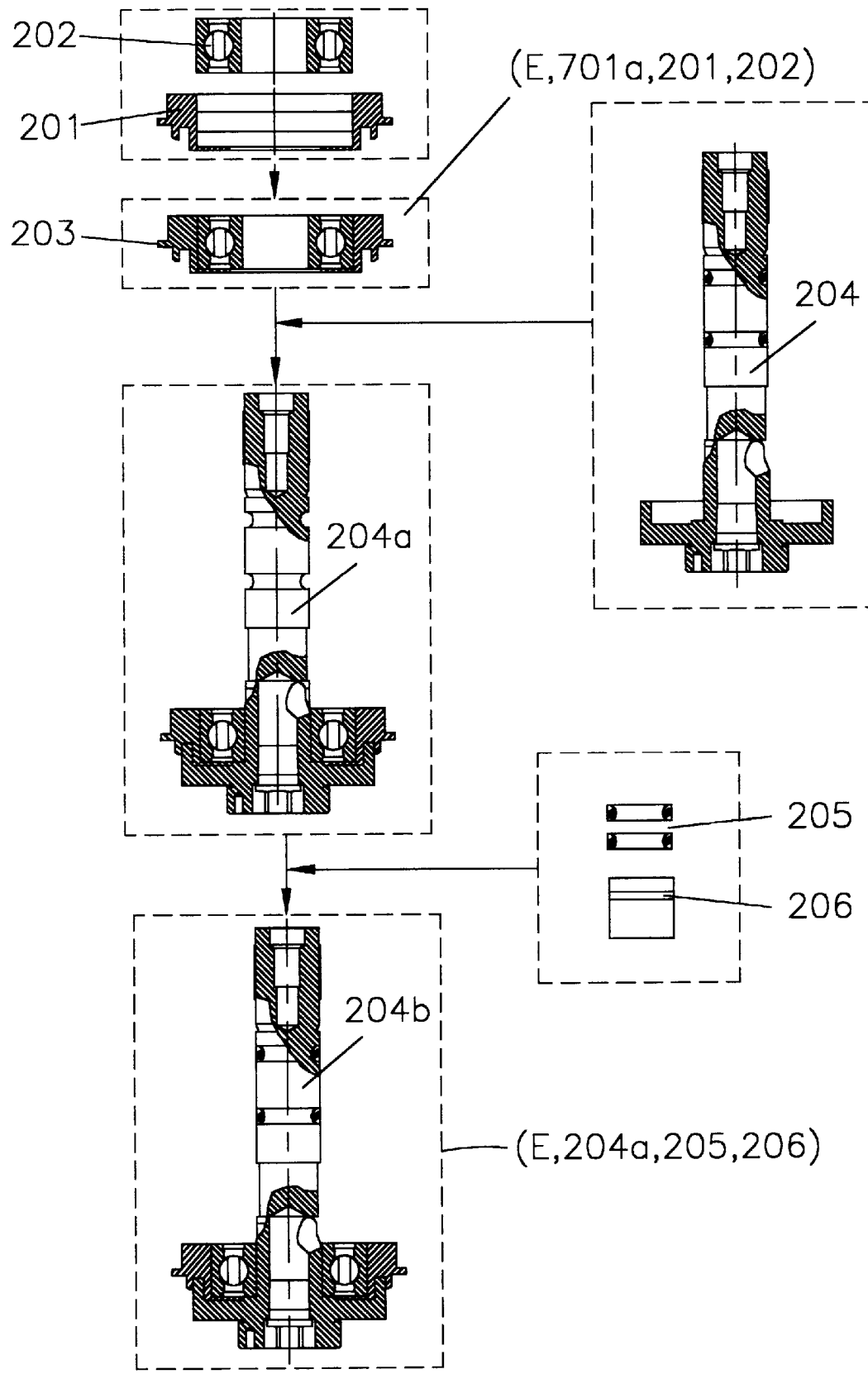
FIG. 2A is Stator Assembly & components as built step by step.

By example, FIG. 2A shows construction of a motor embodiment starting with a Stator assembly. Initial assembly of the Stator involves adhesive treating ("E"), assembling, tensioning and curing of the bearing holder (201) to the rear bearing (202). The first multi-position preload/curing fixture (701a) is used to hold and compressively tension (201) to (202) during curing (these steps are depicted by the dotted lines surrounding the various subassemblies), resulting in subassembly (203). A shaft (204) is then adhesive treated, assembled, and cured with subassembly (203), resulting in subassembly (204a). The next step adds the O-ring (205) and ground clip (206) to subassembly (204a), creating subassembly (204b). Each step includes adhesive treating, assembling, and curing the components.

Figure 2B:
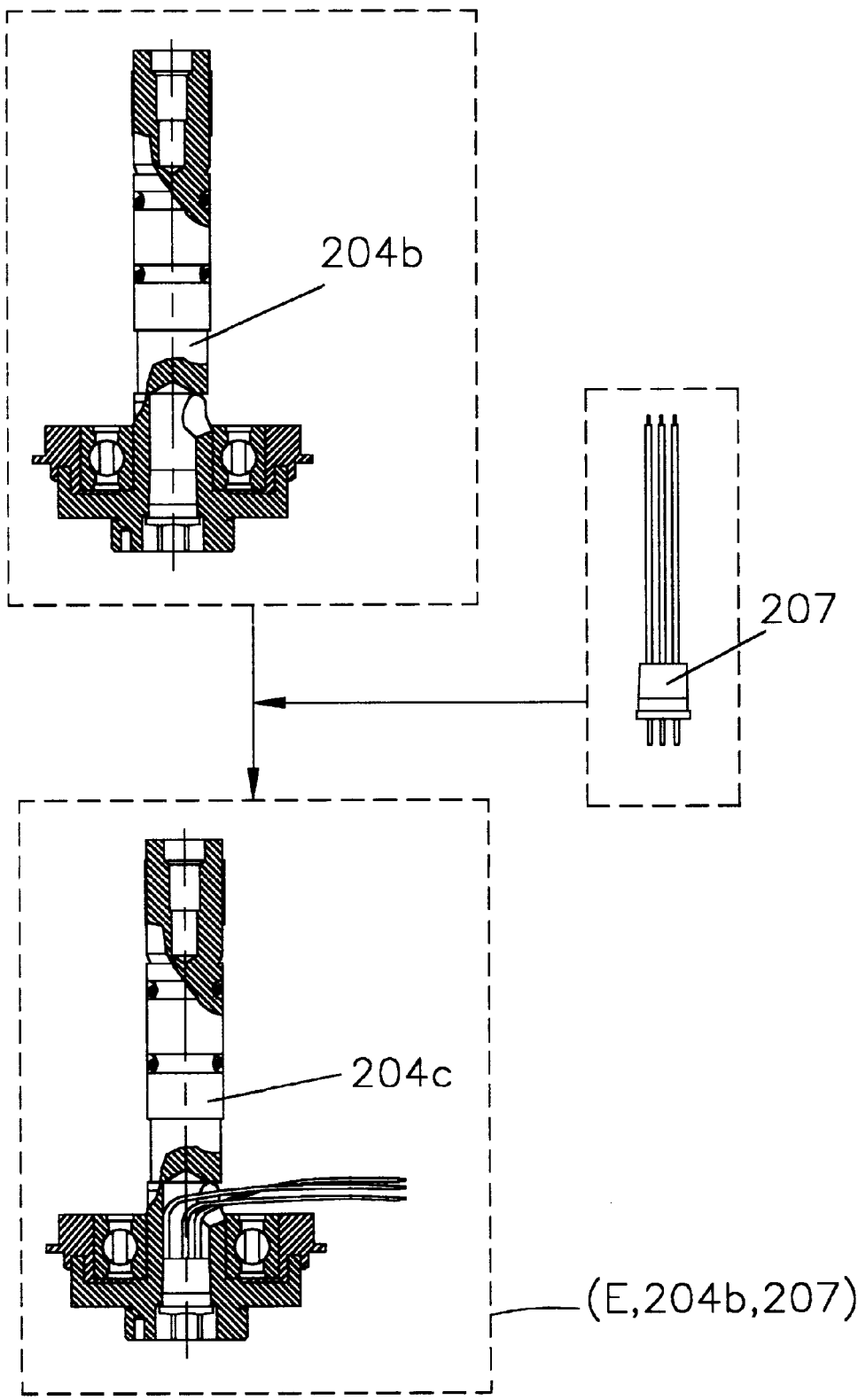
FIG. 2B is Stator Assembly & components as built step by step.

FIG. 2B shows further construction of the Stator. This involves epoxying ("E"), assembling, and curing the connector (207) to subassembly (204b) constructing subassembly (204c).

Figure 2C:
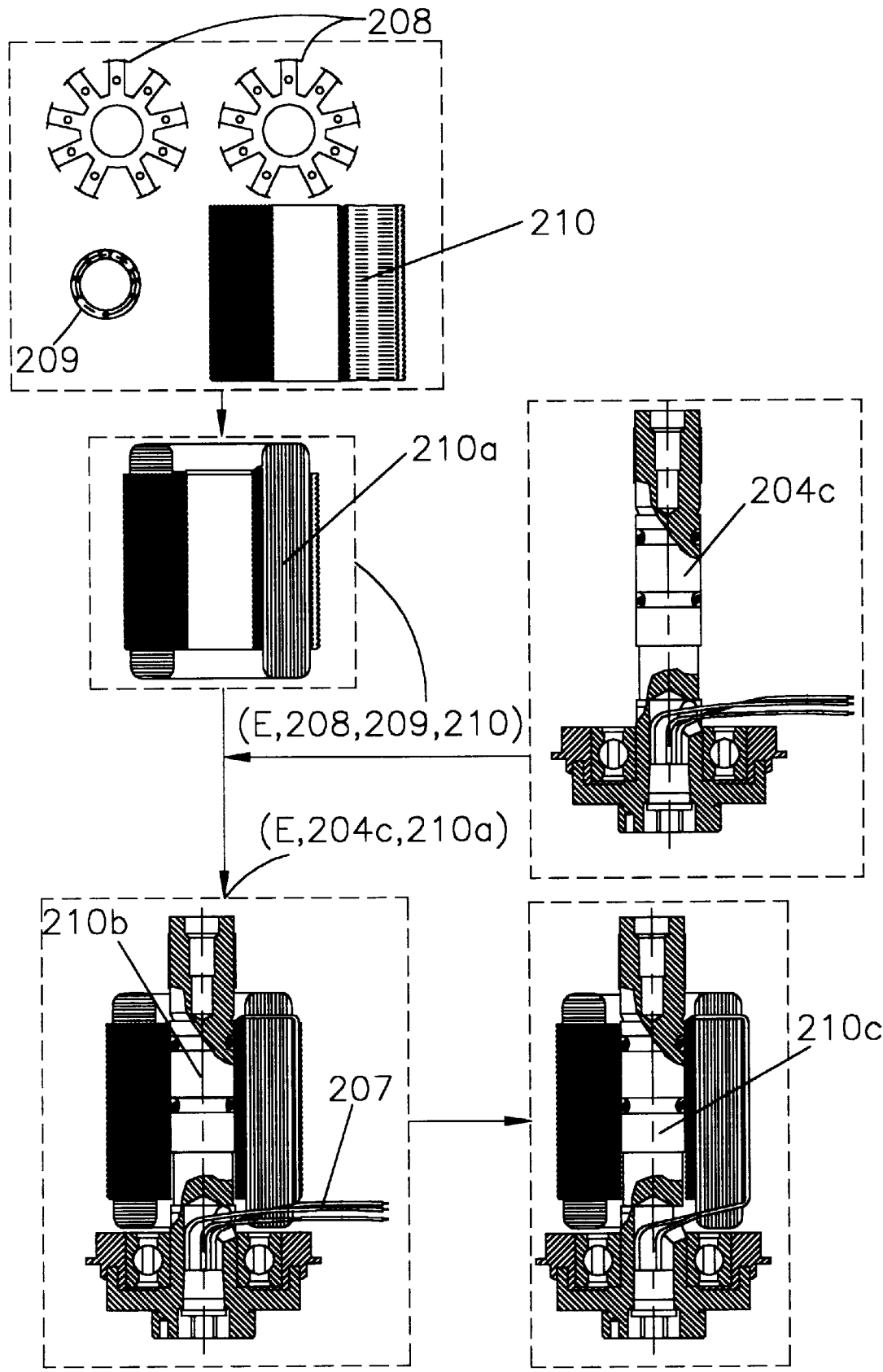
FIG. 2C is Stator Assembly & components as built step by step.

FIG. 2C shows further construction of the Stator. The two wire guides (208) are epoxied ("E"), assembled, and cured with the flex printed circuit (209) and the stator stack (210) to construct the stator assembly (210a). The stator assembly (210a) is adhesive treated, assembled, and cured to assembly (204c) to construct shaft-stator subassembly (210b). The connector (207) subpart is pressed onto the shaft to construct the Stator (210c). Each step includes adhesive treating, assembling, and curing the assembled components.

Figure 3:
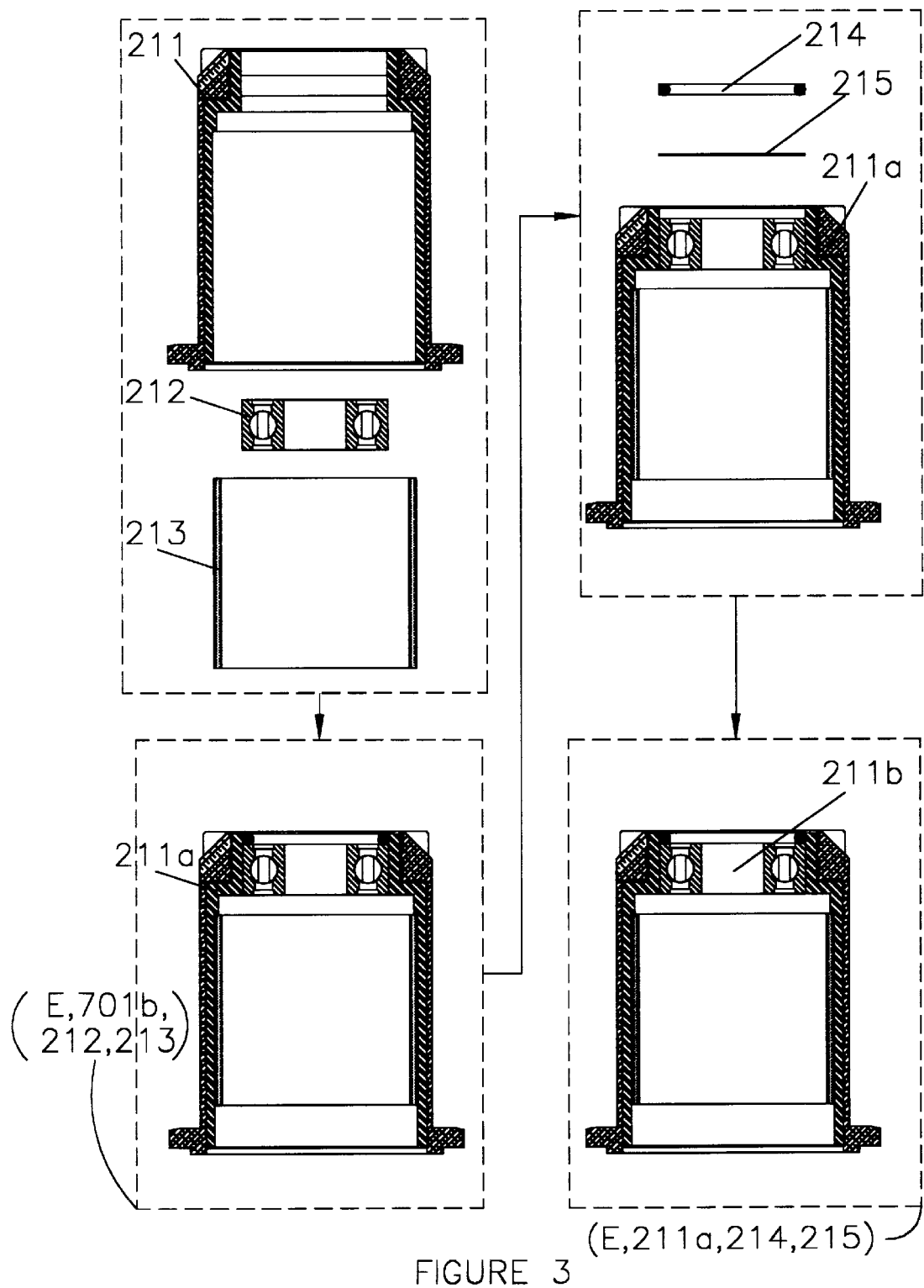
FIG. 3 is Rotor Assembly & components as built step by step.

FIG. 3 shows continued assembly of a motor embodiment featuring the individual components of the Rotor assembly. The first step is the adhesive treating ("E"), assembling, tensioning and curing of the upper bearing (212) to the hub (211) using a second multiposition preload/curing fixture (701b). This second fixture has nests sized to accommodate subassembly (211a). This structure is assembled with the magnet (213) finishing subassembly (211a). This second fixture has nests sized to accommodate subassembly (211a). Subassembly (211a) is further adhesive treated and assembled with a seal ring holder (214) and a spacer (215), then cured completing the Rotor subassembly (211b).

Figure 4:
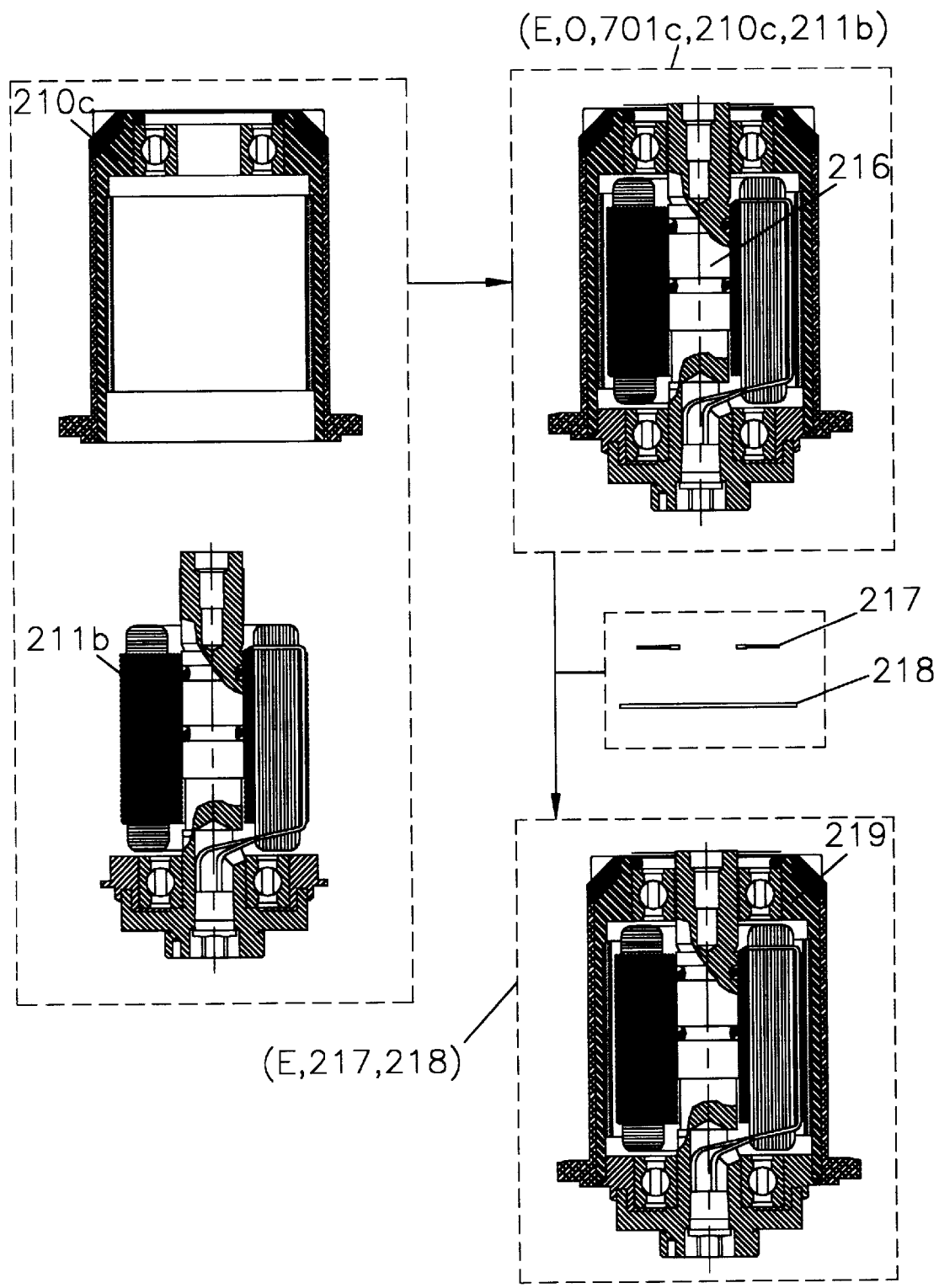
FIG. 4 is the final Motor Assembly step.

FIG. 4 depicts the final stages of assembly. The Rotor assembly (211b of FIG. 3) is adhesive treated ("E") and assembled with the Stator assembly (210c of FIG. 2C) using the second multiposition preload/curing fixture (701c) to compressively tension the motor assembly (216). The motor assembly (216) is overgrammed ("O") using the second multiposition preload/curing fixture (701c) to fully seat the Rotor (211b) inside the Stator (210c). The adhesive treated, assembled, tensioned, and overgrammed Motor (216) is then cured while in the second multiposition preload/curing fixture. The Motor assembly (216) is adhesive treated, then fitted together with a ferrofluid seal (217) and a shield (218), then cured, creating the final motor assembly (219).

Figure 5:
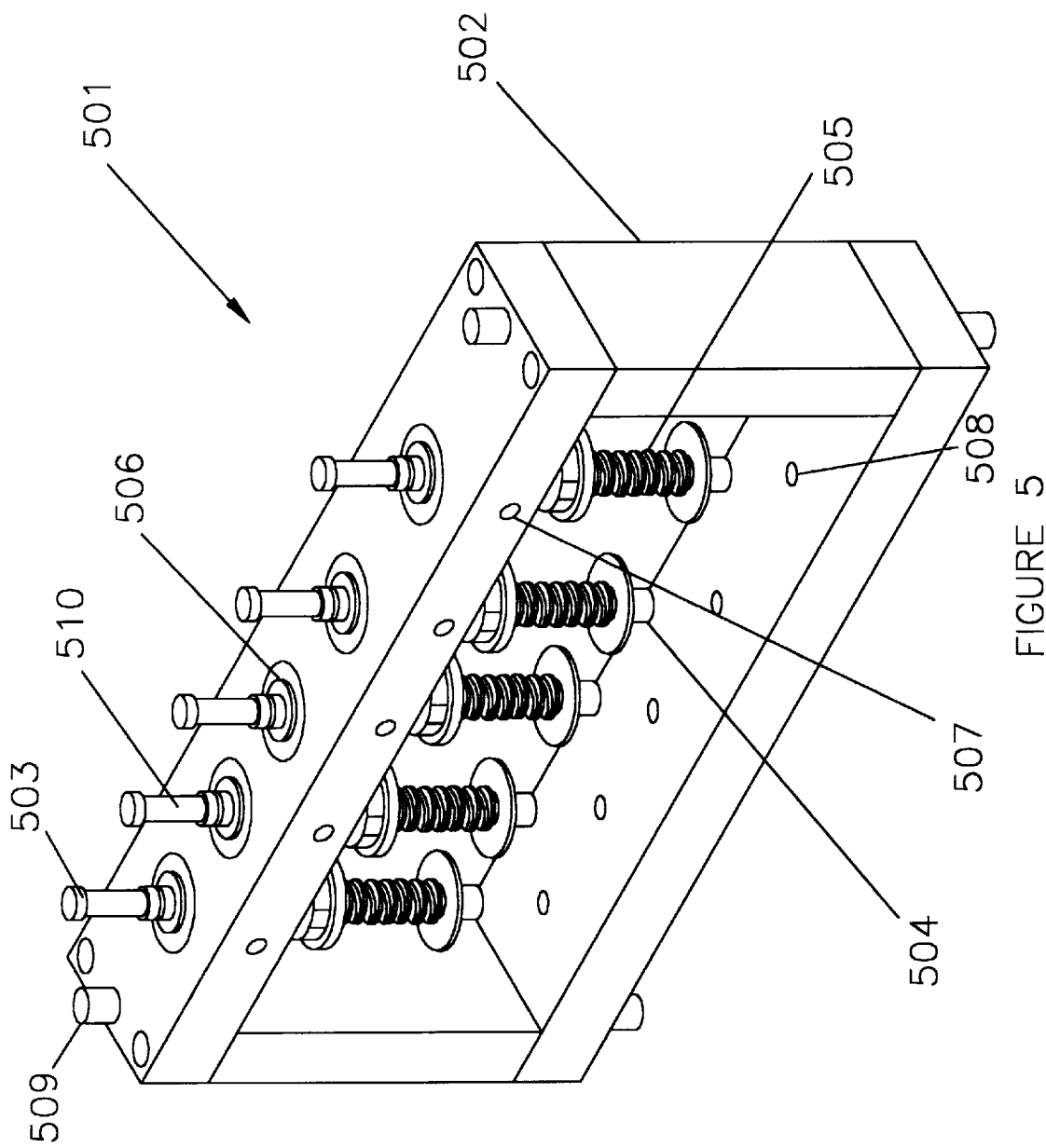
FIG. 5 is a perspective view of the Frame subpart of the "Multi-position Preload/Cure Fixture".

FIG. 5 shows the preferred embodiment of the removable frame subpart (501) of the multiposition preload/curing fixture. The frame (502) may be made of any sufficiently rigid material but is typically made of metal. The frame dimensions are variable to accommodate the size and number of the specific motor components involved, a typical frame is approximately eight inches long, three inches tall, and two inches wide. The frame features a plurality of retractable guide shafts (503) Five shafts are shown in the pictured embodiment (FIG. 5), but the invention may feature as many or as few as needed. The guide shafts (503) of the embodiment shown are typically 5–10 mm in diameter and 8–15 cm long and made of metal. The guide shafts of the invention may be any length or width necessary to properly hold and position motor components. In the preferred embodiment, the guide shafts (503) feature recessed portions that are of narrower diameter (510), with the terminal end widening to the original diameter. The recessed portion (510) enhances guide shaft (503) engagement with retractor notches (606 of FIG. 6). The guide shaft tips feature a bearing nose (504) for securing motor components. Tensioning springs (505) are mounted coaxially with the guide shafts. The guide shafts (503) and springs (505) are mounted in the frame by an adjustable bushing means (506). The bushings of the preferred embodiment are constructed of bronze (but may be constructed of any metal) and are adjusted by a screw accessed through the frame by an access hole (507). The bushings are used to adjust the tension in the coaxial springs (505) by loosening the screw and sliding the bushing until the desired shaft tension is effected. The guide shaft (503) tension should be adjusted with the bushing means (506) to securely compress the motor components, and to compressively preload the bearings, but not so tightly as to damage them. (This pressure varies depending on the specific motor involved.) Once the desired tension is set, the screw is tightened, securing the bushing in place. Directly opposing each guide shaft (503) is a raised tooling ball (508). During use, the motor components are compressibly secured between the spring tensioned guide shaft and the tooling ball. Finally, securement/positioning pins (509) are used to position the frame on the base such that the frame guide shafts (503) can engage the motor components resting in the nests (602) of the base.

Figure 6:
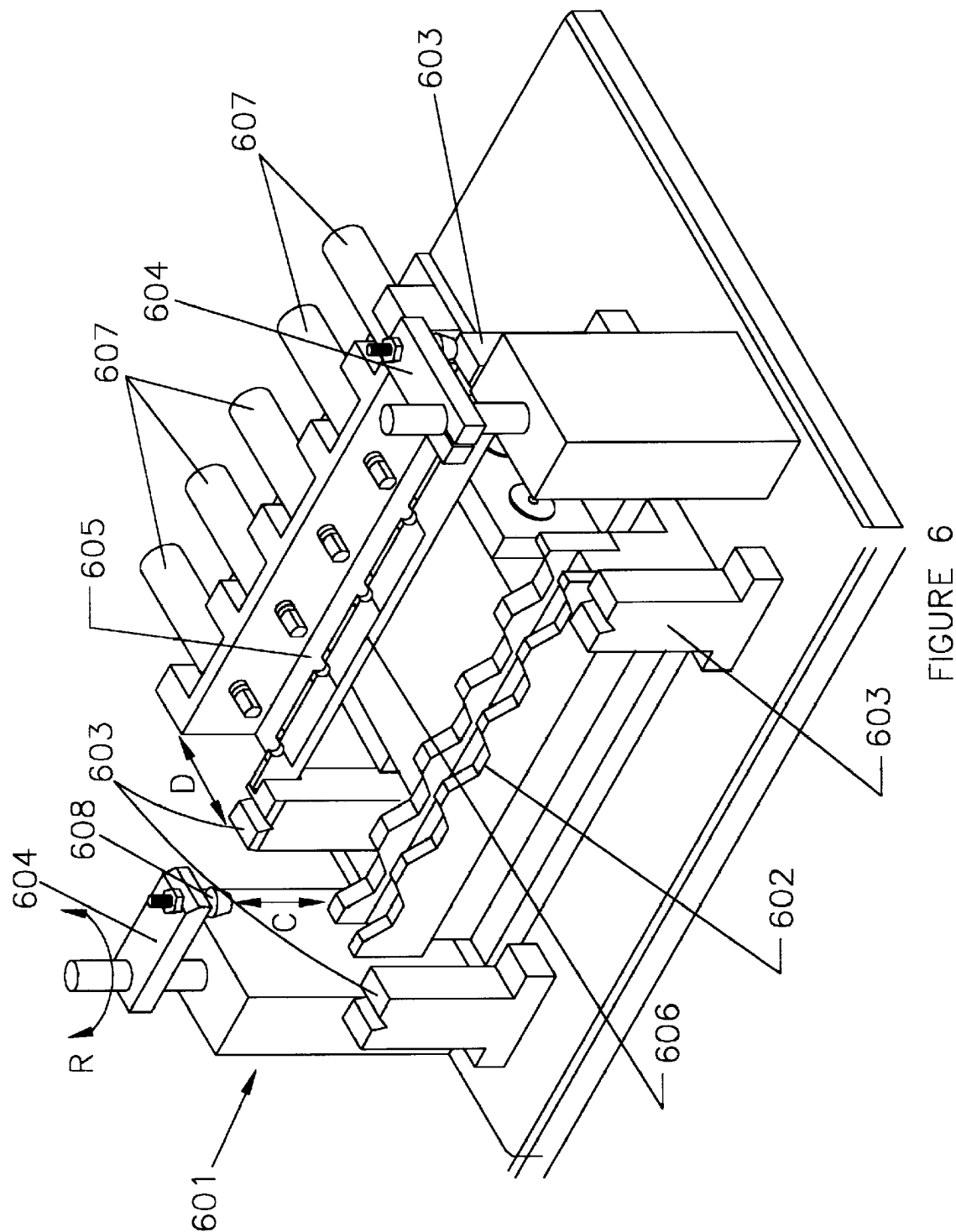
FIG. 6 is Base subpart of the "Multi-position Preload/Cure Fixture."

FIG. 6 shows an embodiment of the base subpart (601) of the present invention. The key feature of the base (601) is the plurality of motor component nests (602) which are shaped to specifically accommodate the motor components being assembled (the pictured embodiment features five nests). Although five nests are shown, the base may have any number of nests. The base (601) features notched mounting blocks (603), which accommodate the securement pins (509) of the frame (501), as shown in FIG. 5. The mounting blocks (603), in combination with the pins (509), optimally position the frame (501) on the base (601) in operative combination with the motor component nests (602). The base (601) also features clamping means (604) for securing the frame (501) to the base (601) during use. The preferred clamping embodiment uses a pneumatic piston (of a type otherwise known in the art) to raise and lower the clamp (604) (in direction "C") and a cam (of a type known in the art) to simultaneously rotate the clamps 90° (in direction "R") allowing the frame subpart (501) to be easily inserted or removed. The preferred embodiment features an adjustable rubber tip (608) to clamp the frame (501) to the base (601). It should be noted that the invention may be practiced with a variety of clamps, and is not limited to pneumatically actuated clamps (e.g. spring loaded clamps, electrically driven clamps, etc.). To facilitate the loading and unloading of motor components from the apparatus during use, the base (601) features a retractor (605) for moving the guide shafts (503 of FIG. 5) backward and forward (direction "D") allowing the insertion and removal of assembled motor components. This same retractor (605) reinserts the guide shafts (503) of the frame (501) after the assembled motor components have been placed in the nests (602). The retractor (605) of the pictured embodiment features a plurality of notches (606)(one for each recessed guide shaft) which enhance the operation of the guide shafts (503 of FIG. 5) by engaging the recessed portion (510 of FIG. 5) of the shaft. The base also features an overgramming means (607) for applying a brief excess pressure to the guide shafts (503) (also in direction "D") during insertion to prevent component binding during assembly. In the pictured embodiment the overgramming pressure is applied by means of pneumatic cylinders (607).

Figure 7:
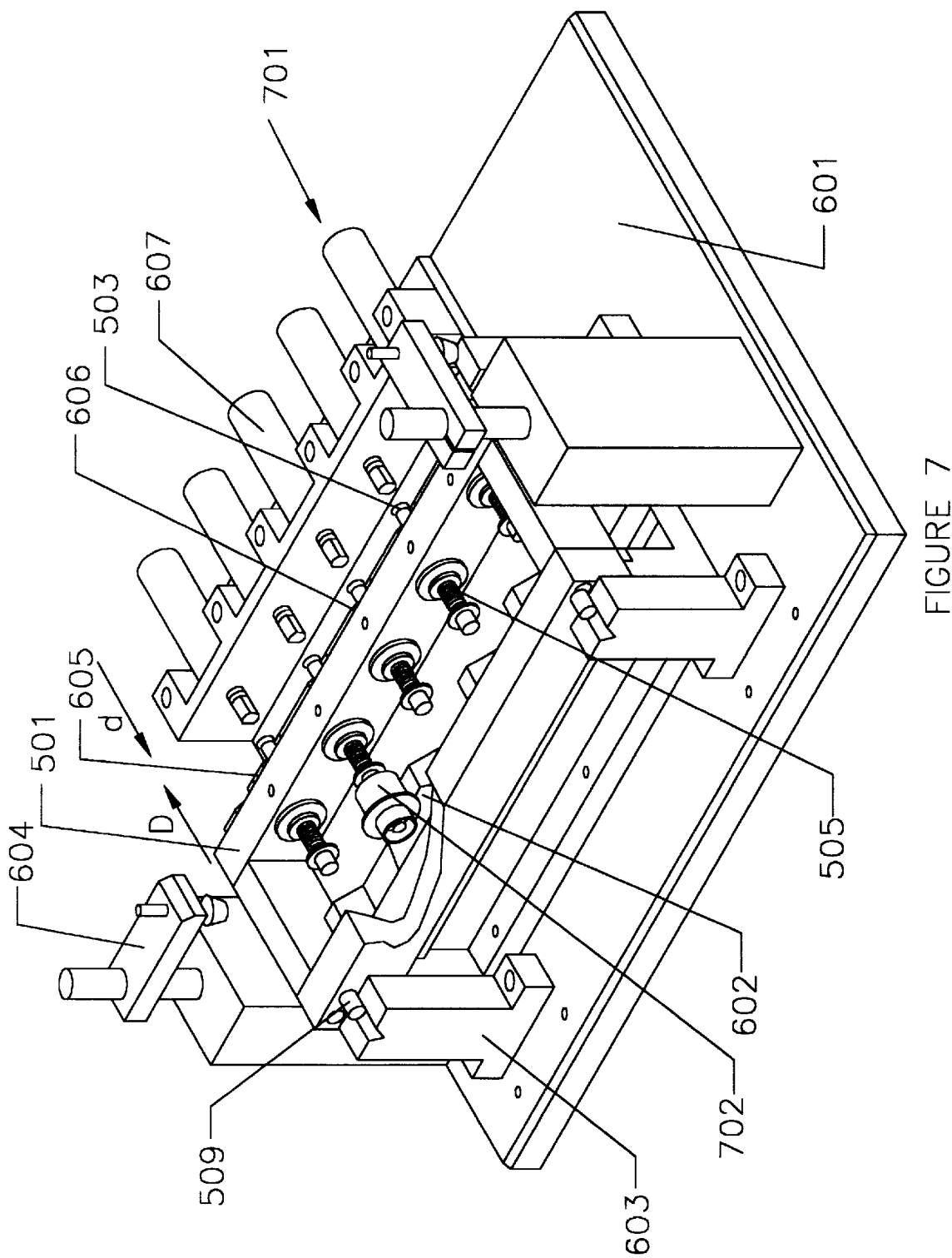
FIG. 7 is a perspective view of the "Multi-position Preload/Cure Fixture" with both subparts in place with a cutout to display the motor nests.

FIG. 7 shows an embodiment of a multi-position preload/cure fixture (701) with both the base subpart (601) and the frame subpart (501) in operative combination with each other. FIG. 7 features a cutout showing a motor component nest (602) cradling a motor (702). FIG. 7 also depicts the operative positioning of the frame securement/positioning pins (509) on the notched mounting blocks (603) of the base.

The multiposition preload curing fixture (701) operates as follows: the frame (501) is positioned on the base (601) as in FIG. 7, the clamp (604) rotates inward and descends, securing the frame to base, the guide shafts (503) rest in the retractor notches (606). Then the retractor (605) moves in direction "D", retracting the guide shafts (503), opening the frame (501). The adhesive treated and assembled components (702) are placed in the nests (602). Then the retractor (605) moves in direction "d" closing the frame (501). Overgramming pistons (607) apply a brief excess pressure in direction "d" to seat the components (702)(e.g. assembling 210c with 211b as shown in FIG. 4), guide shaft tension is maintained by the coaxial tensioning springs (505), the clamps (604) are released, the frame (501) is removed for heat curing of the uncured adhesive, a new frame (501) is inserted and the entire process is repeated.

The present invention has been particularly shown and described with respect to certain preferred embodiments and features thereof. However, it will be readily apparent to those of ordinary skill in the art that various changes and modifications in form and detail may be made without departing from the spirit and scope of the invention as set forth in the appended claims. Finally, the invention disclosed herein may be practiced without any element not specifically disclosed herein.

The applicants claim:

1. A method for assembling a plurality of disc drive motors when using non-outgassing adhesives, said method comprising the steps of:
    a) providing a plurality of partly assembled disc drive motor subassemblies; said subassemblies having surfaces and sub micron components whose performance and reliability are degradable by use of outgassing type of adhesives;
    b) preventing degradation of performance and reliability of said surfaces and submicron components by treating said subassemblies with a non-outgassing adhesive;
    c) compensating for additional adhesive curing time required by said treatment of said subassemblies with said non-outgassing adhesive, as compared to a curing time required by said outgassing type of adhesive, by providing a multi-position preload/cure fixture for facilitating complete assembly manufacture, said fixture comprising: a base piece having a plurality of motor nests, a frame piece having a plurality of retractable shafts, each shaft corresponding to a motor nest of said base piece, each of said shafts having a tensioning means;

d) disposing said frame piece on said base piece such that said shafts are in operative combination with the motor nests of said base piece;

e) retracting said plurality of shafts;

f) placing said plurality of partly assembled motors in said motor nests;

g) engaging said shafts to overgram and compress said plurality of partly assembled motor subassemblies;

h) maintaining a proper tension on said partly assembled motor subassemblies by using said tensioning means;

i) removing said frame piece from said base piece, while maintaining proper tension on said motor subassemblies by said shafts and said tensioning means;

j) curing said plurality of properly tensioned motor subassemblies, said subassemblies remaining tensioned by the shafts of said frame piece during curing;

k) disposing said frame piece on said base piece;

l) retracting said plurality of shafts; and m) removing said plurality of cured subassemblies for further processing into disc drive motors.

2. A method for assembling a plurality of disc drive motors as in claim 1, wherein:

said step c) comprises providing said plurality of retractable shafts having a recessed portion and providing said base piece having a retractor member having a plurality of notches, and wherein said step m) being enhanced by engagement of said recessed portion with said notches, and wherein said tensioning means being spring tensioning means.

3. A method for assembling a plurality of disc drive motors as in claim 1, wherein:

said step g) of engaging said shafts to overgram and compress said plurality of partly assembled motor subassemblies, includes adjusting the tension of said tensioning means on said partly assembled motor subassemblies.

4. A method for assembling a plurality of disc drive motors as in claim 2, wherein:

said step of adjusting the tension of said spring tensioning means includes using a bushing to adjust said spring tensioning means.

5. A method for assembling a plurality of disc drive motors as in claim 1, wherein:

said step j) of curing said plurality of properly tensioned motor subassemblies includes heat curing.

6. A method for assembling a plurality of disc drive motors as in claim 1, wherein:

said step d) comprises disposing said frame piece on said base piece such that said shafts are in operative combination with the motor nests of said base piece and further includes securing said frame piece to said base piece.

7. A method for assembling a plurality of disc drive motors as in claim 1, wherein;

said securing step includes securing said frame to said base using a pneumatic clamp.

* * * * *